United States Patent
Han et al.

(10) Patent No.: US 11,968,254 B1
(45) Date of Patent: Apr. 23, 2024

(54) METHODS AND DEVICES FOR NETWORK CENSORSHIP CIRCUMVENTION

(71) Applicant: Snowstorm Inc., New York, NY (US)

(72) Inventors: Serene Han, New York, NY (US); Mykhailo Marynenko, New York, NY (US)

(73) Assignee: SNOWSTORM INC., New York, NY (US)

( * ) Notice: Subject to any disclaimer, the term of this patent is extended or adjusted under 35 U.S.C. 154(b) by 0 days.

(21) Appl. No.: 18/378,092

(22) Filed: Oct. 9, 2023

Related U.S. Application Data

(60) Provisional application No. 63/378,683, filed on Oct. 7, 2022.

(51) Int. Cl.
| | |
|---|---|
| *G06F 15/16* | (2006.01) |
| *H04L 9/40* | (2022.01) |
| *H04L 61/2517* | (2022.01) |
| *H04L 61/4535* | (2022.01) |
| *H04L 67/104* | (2022.01) |
| *H04L 69/18* | (2022.01) |

(52) U.S. Cl.
CPC ........ *H04L 67/104* (2013.01); *H04L 61/2517* (2013.01); *H04L 61/4535* (2022.05); *H04L 63/0457* (2013.01); *H04L 63/107* (2013.01); *H04L 69/18* (2013.01)

(58) Field of Classification Search
CPC .............. H04L 67/104; H04L 61/4335; H04L 61/2517; H04L 69/18
USPC ................................................. 709/203, 227
See application file for complete search history.

(56) References Cited

U.S. PATENT DOCUMENTS

| | | | | |
|---|---|---|---|---|
| 11,652,697 | B1 * | 5/2023 | Kozlovski | H04L 67/1008 709/224 |
| 2011/0216753 | A1 * | 9/2011 | Kneckt | H04L 67/52 370/338 |
| 2015/0195365 | A1 * | 7/2015 | Choi | H04W 4/70 715/739 |

(Continued)

OTHER PUBLICATIONS

International Search Report and Written Opinion dated Feb. 2, 2024 in corresponding International Patent Application No. PCT/US2023/034759.

*Primary Examiner* — Duyen M Doan
(74) *Attorney, Agent, or Firm* — Troutman Pepper Hamilton Sanders LLP

(57) ABSTRACT

Methods, non-transitory computer readable media, and peer devices are disclosed that facilitate network censorship circumvention. A censored peer sends to a rendezvous peer censored peer location information. A connection with a volunteer peer is then established using volunteer peer location information received from the rendezvous peer for a matched volunteer peer. First network traffic is then sent to the volunteer peer in accordance with a first network protocol using a second network protocol associated with the connection. The first network traffic is directed to a network host restricted with respect to the censored peer and the second network protocol is a peer-to-peer network protocol. Second network traffic responsive to the first network traffic is then extracted from network message(s) to thereby obtain access to the restricted network host via the volunteer peer. The first network messages are in accordance with the second network protocol and received via the connection.

20 Claims, 7 Drawing Sheets

(56) References Cited

U.S. PATENT DOCUMENTS

| | | | | |
|---|---|---|---|---|
| 2019/0356701 A1* | 11/2019 | Prabhu | ............... | H04L 65/60 |
| 2020/0036801 A1* | 1/2020 | Lu | ..................... | H04W 4/70 |
| 2022/0103525 A1 | 3/2022 | Shribman et al. | | |
| 2023/0412701 A1* | 12/2023 | Pilkauskas | .......... | H04L 67/1021 |

* cited by examiner

METHODS AND DEVICES FOR NETWORK CENSORSHIP CIRCUMVENTION

CROSS-REFERENCE TO RELATED APPLICATION

This application claims priority to U.S. Provisional Patent Application No. 63/378,683, filed Oct. 7, 2022, which is incorporated herein by reference in its entirety.

FIELD

The disclosed technology generally relates to network protocols, cybersecurity, information technology, and mesh networks and, more particularly, to methods and devices for network censorship circumvention.

BACKGROUND

Much of the world relies on the Internet for basic functions in daily life and commerce. Connectivity to the global Internet is based on a stack of technologies and protocols that enable reliable data transmission with continuously improving throughput, as more users come online and networks scale. However, the architecture of the stack, including some legacy structures and naive protocols from decades ago that do not consider contemporary security concerns, results in fundamental vulnerabilities that put users at risk.

For example, infringement of privacy, theft of data, identity, and sensitive information (e.g., bank account data), and the manipulation and filtering of the information environment and media lead to socioeconomic damages of many varieties and magnitudes for all types of users. In addition, research has shown that censors (e.g., government-sponsored) have the capability to monitor and filter user connections within a region (e.g., a particular country), and that they make use of this capability for a variety of motivations, which are often adversarial. These vulnerabilities, exploited by various actors, have also led to the gradual splintering of the Internet into localized intranets for nation-states that wish to isolate its users from the rest of the world and associated external networks.

Meanwhile, the development of the field of information security, and the subfield of Internet freedom technology, also has grown in an attempt to address these issues and vulnerabilities, keep users secure, keep connections private, ensure digital rights for users, and protect the future of the global Internet. The information security field has yielded various techniques and protocols that modify, encrypt, and defend user network traffic against adversaries. However, current technologies are generally ineffective at addressing the sophistication of adversarial censorship in modern computer networks.

SUMMARY

Described herein are systems and methods for facilitating network censorship circumvention. The disclosed technology addresses the need for more effective and robust methods, systems, and mesh networks that provide unfettered access to the global Internet to censored peer device users in censored regions via volunteer peer devices in uncensored regions.

In one embodiment, the present disclosure relates to a method for network censorship circumvention that is implemented by a censored peer device. Censored peer location information is sent to a rendezvous peer device. A connection with a volunteer peer device is then established using volunteer peer location information received from the rendezvous peer device and corresponding to the volunteer peer device. The volunteer peer device is matched to the censored peer device by the rendezvous peer device. First network traffic is then sent to the volunteer peer device in accordance with a first network protocol using a second network protocol associated with the established connection. The first network traffic is directed to a network host restricted with respect to the censored peer device and the second network protocol is a peer-to-peer network protocol. Second network traffic responsive to the first network traffic is then extracted from one or more first network messages to thereby obtain access to the restricted network host via the volunteer peer device. The first network messages are in accordance with the second network protocol and received via the established connection.

In some examples, one or more of the censored peer location information or the volunteer peer location information comprises an Internet protocol (IP) address and a port number. In these examples, the method includes obtaining the censored peer location information from a server device disposed on an opposite side of a network address translation (NAT) device as the censored peer device.

In other examples, the first network protocol is hypertext transfer protocol (HTTP) and the second network protocol is web real-time communication (WebRTC). In these examples, a first endpoint in accordance with the censored peer location information is held open after sending the censored peer location information to the rendezvous peer device. The connection is established via a second endpoint at the volunteer peer device and corresponding to the volunteer peer location information. The second network traffic extracted from the first network messages in the WebRTC protocol and rendered in a web browser of the censored peer device. In yet other examples, the first endpoint corresponds to a virtual network interface (VNI).

The method in other examples includes sending a session description protocol (SDP) offer in a first body of a first hypertext transfer protocol (HTTP) message to the rendezvous peer device. The SDP offer comprises the censored peer location information. An SDP answer is received in a second body of a second HTTP message from the rendezvous peer device. The SDP answer comprises the volunteer peer location information. In another example, the method includes instantiating a local socket secure (SOCKS) proxy server interface. A web browser executing on the censored peer device is configured to direct the first network traffic generated by the web browser to the local SOCKS proxy server interface. The first network traffic is encapsulated in one or more second network messages in a format in accordance with the second network protocol. The local SOCKS proxy server interface corresponds to an endpoint of the established connection at the censored peer device.

In other examples, the method includes determining that the network host is restricted before sending the censored peer location information to the rendezvous peer device. In these examples, the rendezvous peer device is polled until the volunteer peer location information is received from the rendezvous peer device upon the rendezvous peer device matching the volunteer peer device to the censored peer device.

The method can also include sending to the rendezvous peer device negotiation metadata before establishing the connection. The negotiation metadata is used by the rendezvous peer device to match the censored peer device to the volunteer peer device and comprises one or more of a NAT information, a bridge fingerprint, a signal strength, a geolocation, network topology information, a score, an indication of a current load, or another indication of a current bandwidth. Additionally, the method in other examples includes encrypting the first network traffic before streaming the first network traffic within one or more second network messages via the established connection and in accordance with the second network protocol.

In another embodiment, a rendezvous peer device is disclosed that includes memory having instructions stored thereon and one or more processors coupled to the memory and configured to execute the stored instructions to obtain a first offer message from a censored peer device and a second offer message from a volunteer peer device. The first offer message comprises censored peer location information and first negotiation metadata and the second offer message comprises volunteer peer location information and second negotiation metadata. A determination is made that the volunteer peer device is a match for the censored peer device based on a score generated from the first and second negotiation metadata. The first and second negotiation metadata comprise a network topology associated with the censored and volunteer peer device, respectively. A first answer message is sent to the censored peer device and a second answer message to the volunteer peer device. The first answer message comprises the volunteer peer location information and the second answer message comprises the censored peer location information. The first and second answer messages facilitate establishment of a peer connection between the volunteer and censored peer devices.

In some examples, the first and second offer messages comprise session SDP offers, the first and second answer messages comprise SDP answers, the SDP offers and answers are included in the body of respective HTTP messages, and one or more of the censored peer location information or the volunteer peer location information comprises an Internet protocol (IP) address and a port number. In other examples, one or more of the first or second negotiation metadata further comprises NAT information, a bridge fingerprint, a signal strength, a geolocation, an indication of a current load, or another indication of a current bandwidth.

In yet other examples, the rendezvous peer device comprises a plurality of communication interfaces each comprising an antenna and associated with a different network protocol and one or more different capabilities selected from power, range, or bandwidth. In these examples, the first offer message and the second offer message are received on a different one of the communication interfaces.

In yet another embodiment, a non-transitory computer readable medium is disclosed that has stored thereon instructions comprising executable code that, when executed by one or more processors of a volunteer peer device, causes the volunteer peer device to send to a rendezvous peer device volunteer peer location information. A connection with a censored peer device is established using censored peer location information received from the rendezvous peer device and corresponding to the censored peer device. The censored peer device is matched to the volunteer peer device by the rendezvous peer device. First network traffic in accordance with a first network protocol is received from the censored peer device using a second network protocol associated with the established connection. The first network traffic is directed to a network host restricted with respect to the censored peer device and the second network protocol is a peer-to-peer network protocol. Content is retrieved from the network host in accordance with the first network traffic. The retrieved content is returned to the censored peer device via the established connection and one or more network messages in accordance with the second network protocol. The retrieved content is included in the network messages in accordance with the first network protocol.

In some examples, one or more of the censored peer location information or the volunteer peer location information comprises an IP address and a port number. In other examples, the first network protocol is HTTP, the second network protocol is WebRTC, and the executable code, when executed by the processors, further causes the volunteer peer device to hold open a first endpoint in accordance with the volunteer peer location information after sending the volunteer peer location information to the rendezvous peer device. The connection is then established via a second endpoint at the censored peer device and corresponding to the censored peer location information.

In yet other examples, the executable code, when executed by the processors, further causes the volunteer peer device to send an SDP offer in a first body of a first HTTP message to the rendezvous peer device. The SDP offer comprises the volunteer peer location information. An SDP answer is received in a second body of a second HTTP message from the rendezvous peer device. The SDP answer comprises the censored peer location information. The executable code, when executed by the processors, can further cause the volunteer peer device to poll the rendezvous peer device until the censored peer location information is received from the rendezvous peer device upon the rendezvous peer device matching the volunteer peer device to the censored peer device.

In some examples, the executable code, when executed by the processors, further causes the volunteer peer device to send to the rendezvous peer device negotiation metadata before establishing the connection. The negotiation metadata is used by the rendezvous peer device to match the censored peer device to the volunteer peer device and comprises one or more of a NAT information, a bridge fingerprint, a signal strength, a geolocation, network topology information, a score, an indication of a current load, or another indication of a current bandwidth. The executable code, when executed by the processors, can further cause the volunteer peer device to decrypt the first network traffic before retrieving the content from the network host. The second network traffic is encrypted before streaming the second network traffic within the second network messages via the established connection and in accordance with the second network protocol.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, devices and methods described, as these may vary. The terminology used in the description is for the purpose of describing the particular versions or embodiments only and is not intended to limit the scope.

Figure 1:
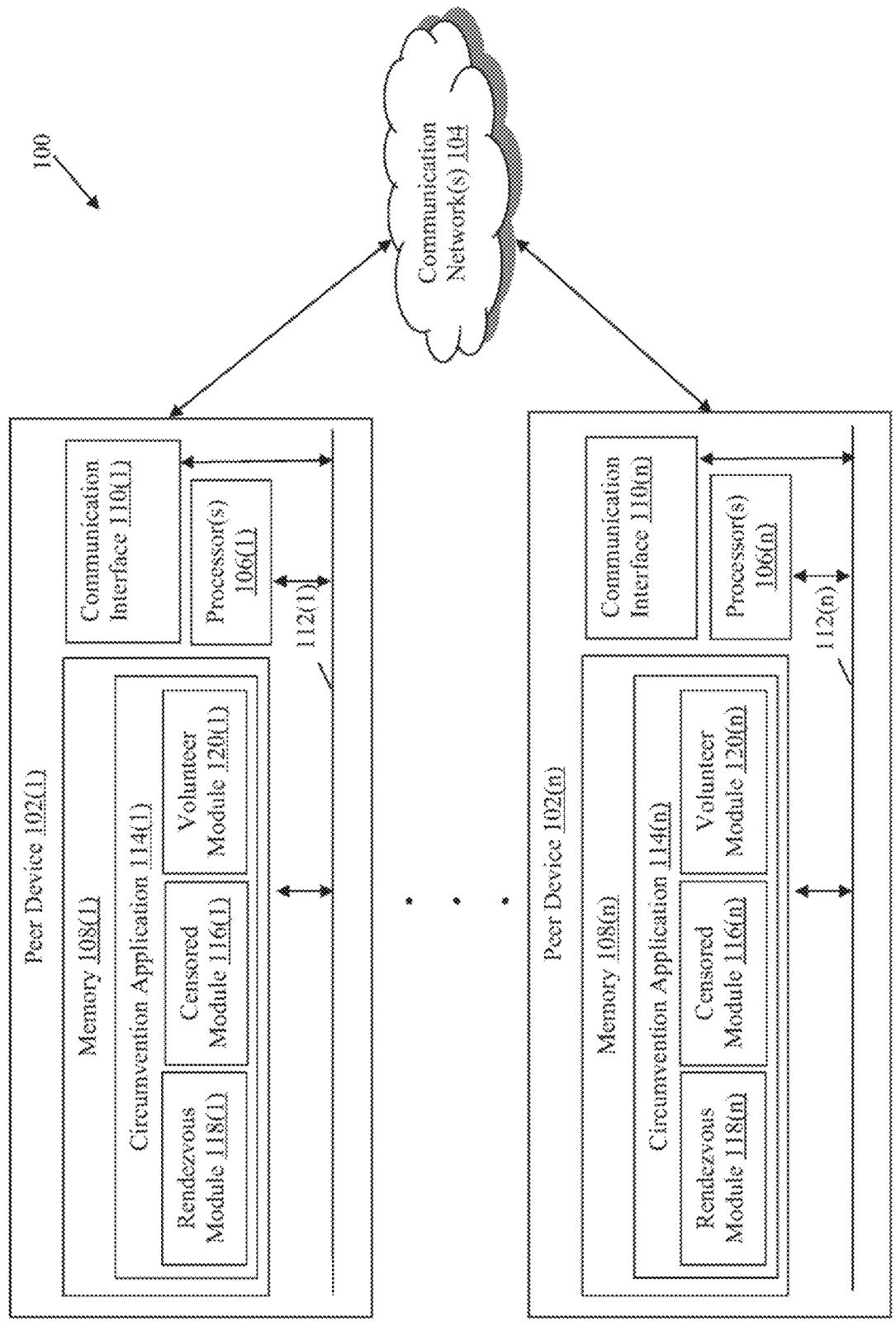
FIG. 1 is a block diagram of an exemplary network environment with peer devices that can alternately act as volunteer, filtered, and/or rendezvous peer devices.

Referring to FIG. 1, an exemplary network environment 100 is illustrated that includes peer devices 102(1)-102(n), which are coupled together via communication network(s) 104. The network environment 100 may include other network devices such as one or more routers, switches, servers, and/or access points, for example, which are known in the art and thus will not be described herein. In this example, each of the peer devices 102(1)-102(n) is disclosed in FIG. 1 as a dedicated hardware device. However, one or more of the peer devices 102(1)-102(n) can also be implemented in software within one or more other devices in the network environment 100 in other examples.

Each of the peer devices 102(1)-102(n) may perform any number of functions, including transmitting network messages according to any number of protocols via the communication network(s) 104 to provide a user access to a particular network (e.g., the Internet) or facilitate access to a particular network by a user of another one of the peer devices 102(1)-102(n). Each of the peer devices 102(1)-102(n) in this example includes processor(s) 106(1)-106(n), memory 108(1)-108(n), and a communication interface 110(1)-110(n), which are coupled together by a bus 112(1)-112(n), although one or more of the peer devices 102(1)-102(n) can include other types or numbers of elements in other configurations. For example, one or more of the peer devices 102(1)-102(n) can include specialized chipset(s) to facilitate faster execution of tasks such as encryption, serialization, and/or compression.

The processor(s) 106(1)-106(n) of the peer devices 102(1)-102(n) may execute programmed instructions stored in the memories 108(1)-108(n) of the peer devices 102(1)-102(n) for any number of the functions described herein. The processor(s) 106(1)-106(n) may include one or more processing cores, central processing units, and/or graphics processing units, for example, although other types of processor(s) can also be used.

Each of the memories 108(1)-108(n) stores these programmed instructions for one or more aspects of the present technology as described herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s) 106(1)-106(n), can be used for the memories 108(1)-108(n).

Accordingly, the memories 108(1)-108(n) can store applications that can include computer executable instructions that, when executed by the processor(s) 106(1)-106(n), cause the peer computing device 102(1)-102(n) to perform actions, such as to transmit, receive, or otherwise process network messages and requests, generate graphical interfaces and displays, and perform other actions described and illustrated herein. The application(s) can be implemented as components of other applications, operating system extensions, and/or plugins, for example, although other types or applications can also be used.

Further, the application(s) can be executed within or as virtual machine(s) or virtual server(s) that may be managed in a cloud-based computing environment. Also, the application(s), and even one or more of the peer devices 102(1)-102(n) themselves, may be located in virtual server(s) running in a cloud-based computing environment rather than being tied to specific physical network computing devices.

In some examples, each of the memories 108(1)-108(n) includes a circumvention application 114(1)-114(n), each of which includes a censored module 116(1)-116(n), a rendezvous module 118(1)-118(n), and/or a volunteer module 120(1)-120(n). In the examples described and illustrated herein, a volunteer one of the peer device 102(1)-102(n) is currently executing one of the volunteer modules 120(1)-120(n), a censored one of the peer device 102(1)-102(n) is currently executing one of the censored modules 116(1)-116(n), and a rendezvous one of the peer device 102(1)-102(n) (also referred to herein as a rendezvous server) is currently executing one of the rendezvous modules 118(1)-118(n). However, only a subset of the modules illustrated in FIG. 1 may be included in the circumvention application 114(1)-114(n) for any particular one of the peer devices 102(1)-102(n) and any of the peer devices 102(1)-102(n) can be acting or operating as a volunteer, censored, and/or rendezvous peer device at any particular time, as will be explained in more detail below.

Each of the censored modules 116(1)-116(n) in this example generally obtains information about the network location (e.g., an Internet protocol (IP) address and port) of one of the peer devices 102(1)-102(n) on which it is executing and sends that location information, along with negotiation metadata, to a rendezvous peer device in the form of an offer. If the rendezvous peer device identifies a match with a volunteer peer device, other location information for the volunteer peer device is provided in return to the censored peer device in the form of an answer. Each of the censored modules 116(1)-116(n) is configured to then use that other location information to establish a connection with the volunteer peer device. With the established connection, the censored peer device can reach network hosts filtered within the censored region in which the censored peer device is located but accessible to the volunteer peer device in the uncensored region in which the volunteer peer device is located.

Thus, each of the volunteer modules 120(1)-120(n) is configured to obtain information about the network location of one of the peer devices 102(1)-102(n) on which it is executing and send that location information along with negotiation metadata to a rendezvous peer device to facilitate the matching. Each of the rendezvous modules 118(1)-118(n) is configured to execute a matching algorithm, using the network locations and negotiation metadata obtained from volunteer and censored peer devices, to coordinate and facilitate a connection between those devices, as will also be explained in more detail below. The operation of each of the censored modules 116(1)-116(n) is described and illustrated in more detail below with reference to FIGS. 3-4, the operation of each of the volunteer modules 120(1)-120(n) is described and illustrated in more detail below with reference to FIGS. 5-6, and the operation of each of the rendezvous modules 118(1)-118(n) is described and illustrated in more detail below with reference to FIG. 7.

Each of the communication interfaces 110(1)-110(n) of the peer devices 102(1)-102(n) operatively couples and communicates between the peer devices 102(1)-102(n) that are coupled together at least in part by the communication network(s) 104 in this particular example, although other types or numbers of communication networks or systems with other types or numbers of connections or configurations to other devices or elements can also be used. The communication network(s) 104 can include wide area network(s) (WAN(s)) and/or local area network(s) (LAN(s)), for example, and can use TCP/IP over Ethernet and industry-standard protocols, although other types or numbers of protocols or communication networks can be used, as explained in more detail below. The communication network(s) 104 can employ any suitable interface mechanisms and network communication technologies including, for example, Ethernet-based Packet Data Networks (PDNs) and can perform advanced networking functions (e.g., act as a switch).

In some examples, one or more of the communication interfaces 110(1)-110(n) can include any number of antennas configured to facilitate various capabilities, such as high proximity, low bandwidth radio protocols such as IPv6 over low power wireless personal area networks (6LoWPAN), low power wide area networks (WAN) (LPWAN) (e.g., provided by Sigfox™, of Labège, France), narrowband Internet of things (IoT) (NB-IoT), and/or long range WAN (LoRaWAN™) and/or low proximity, high bandwidth radio protocols such as ultra-wideband (UWB), Bluetooth™, and/or IEEE 802.11 (i.e., Wi-Fi). In current radio technology, the available bandwidth decreases as the distance increases. However, low bandwidth transports can be used for peer device discovery in relative proximity After discovery, a censored peer device, for example, can upgrade to a higher bandwidth protocol through a chain of peer devices one or more of which may have been mutually discovered by respective peer devices that directly discovered each other, as will be explained in more detail below. Thus, one or more of the peer devices 102(1)-102(n) can include features such as antennas, chipsets, ports, radio capabilities, and/or form factors that are tailored for particular applications of the technology described and illustrated herein.

Although the exemplary network environment 100 with the peer devices 102(1)-102(n) and communication network(s) 104 is described herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100 may be configured to operate as virtual instances on the same physical machine. In other words, one or more of the peer devices 102(1)-102(n) may operate on the same physical device rather than as separate devices communicating through the communication network(s) 104. Additionally, any number of peer devices 102(1)-102(n) may be included in the network environment 100 illustrated in FIG. 1.

The examples of this technology may also be embodied as one or more non-transitory computer readable media having instructions stored thereon, such as in the memories 108(1)-108(n) of the peer devices 102(1)-102(n), for one or more aspects of the present technology, as described and illustrated by way of the examples herein. The instructions in some examples include executable code that, when executed by one or more processors, such as the processor(s) 106(1)-106(n) of the peer devices 102(1)-102(n), cause the processors to carry out steps necessary to implement the methods of the examples of this technology that will now be described herein.

Figure 2:
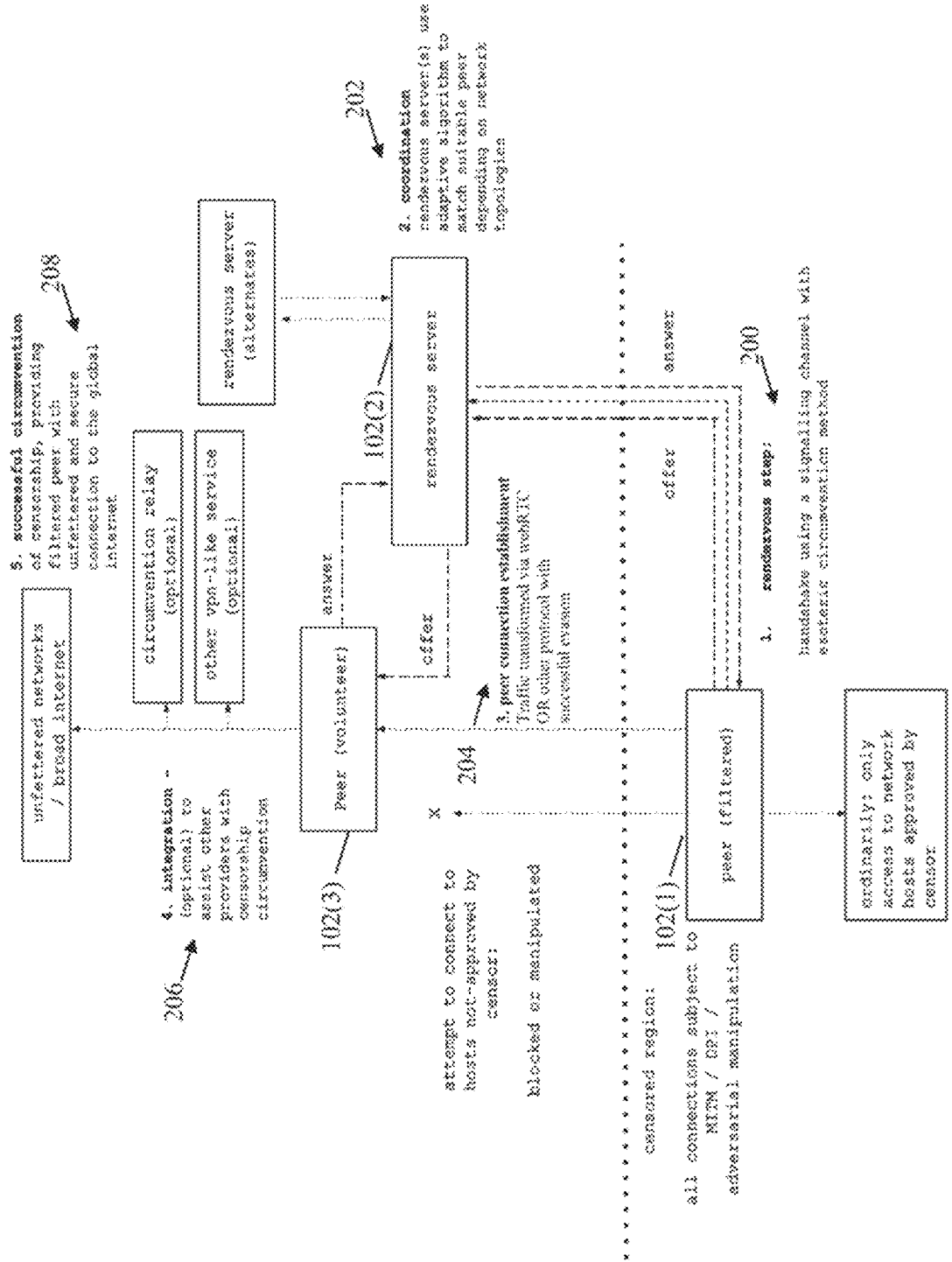
FIG. 2 is a flow diagram of an exemplary method for network censorship circumvention.

Referring now to FIG. 2, a flow diagram of an exemplary method for network censorship circumvention is illustrated. This technology facilitates establishment of a network of clients or peers that may have bi-directional functionality including the capability of both being the subject of a censorship circumvention need for users within filtered regions or for being a proxy that provides the censorship circumvention capability to peers having the censorship circumvention need. In this particular example, the censored peer device 102(1) is located in a censored region in which network connections are subject to man-in-the-middle (MITM) attacks, deep packet inspection (DPI), and/or are otherwise subject to adversarial manipulation. In the censored region, attempts by the censored peer device 102(1) to connect to certain unapproved network hosts are blocked or manipulated by a censor (e.g., government entity). The rendezvous peer device 102(2) and the volunteer peer device 102(3) are in an unfiltered region and aid the censored peer device 102(1) in circumventing the censorship in the censored region to thereby facilitate unfettered and secure connectivity to the global Internet.

Thus, in some examples, this technology includes esoteric rendezvous methods including temporary message passing channels that evade the censor and can involve various methods including versions of steganography to facilitate handshakes between the various peer devices 102(1)-102(3) to bootstrap and establish the peer-to-peer connections for the purpose of providing a longer-term sustained secure unfettered connection on a transport different from the initial rendezvous method, as will now be described. In step 200 in this example, the censored peer device 102(1) sends an initial message to the rendezvous peer device 102(2), which can be a hypertext transfer protocol (HTTP) message that encapsulates, or includes in its body, a session description protocol (SDP) offer, for example, although other types of network messages can also be used.

The encapsulated SDP offer can include a network location (e.g., IP address and port) of the censored peer device 102(1), which can be obtained as explained in more detail below, along with negotiation metadata, such as network topology and other information that can be used to more effectively match the censored peer device 102(1) with the volunteer peer device 102(3). In some examples, the circumvention application 114 of the censored peer device 102(1) is preconfigured with, or configured to search and identify, the network location of the rendezvous peer device 102(2) to which the SDP offer is directed. The rendezvous peer device 102(2) responds, optionally via an HTTP message with an SDP answer encapsulated in the body. The SDP answer includes an optional session ID and a network location of the volunteer peer device 102(3).

In some examples, the rendezvous peer device 102(2) implements a meta-coordination algorithm to coordinate between the multiple rendezvous peers. Optionally, the multiple rendezvous peers are geographically sharded for fault-tolerance, redundancy, and replicability, while having a backup communication mechanism for mutual discovery and algorithmically determining loads and latencies for sensible load-balancing and distribution of volunteer and censored peer devices.

Advantageously, if one rendezvous peer goes down or is compromised in these examples, child peer devices do not get orphaned and can maintain alternate paths towards obtaining some signaling channel from some rendezvous peer to be able to achieve their function. In these examples, scripts can be used to generate a custom parent rendezvous peer with built-in child rendezvous peers that default to sending initial signaling messages (e.g., offers and answers) to the parent rendezvous peer. The parent rendezvous peer in these examples can be self-hosted or deployed via containerization methods to a cloud hosting service, for example.

Optionally, the rendezvous peers can maintain a private in-memory directory of other rendezvous peers and/or can use an adaptive and probabilistic update to historical distributed hash table methods, with assumptions that other rendezvous peers may or may not be subjected to adversarial actions. Additionally, fallback coordination servers, internal tracking of existing sibling rendezvous peers with quality and trustworthiness estimates based on geographic implications and historical latency measurement, and/or time decay of last successful hand-off of a potential volunteer and censored peer match can also be used in these examples. Also optionally, any of the rendezvous peers may present a secured dashboard (e.g., public-facing or for privileged administrators) to facilitate inspection of the health and integrity of the rendezvous peers and/or to maintain the rendezvous peers.

Referring back to FIG. 2, in step 202, prior to providing the SDP answer, the rendezvous peer device 102(2) performs an adaptive algorithm that matches suitable volunteer and censored peer devices based on any number of factors, such as network topologies of those devices. The negotiation metadata used to match volunteer and censored peer devices is scrubbed and non-identifying in some examples.

Intelligent filtering mechanisms that evaluate the quality and trustworthiness of each of the censored peer device 102(1) and/or volunteer peer device 102(3) based on the supplied negotiation metadata can be used to generate a match. The matching algorithm performed by the rendezvous peer device 102(2) also can consider suitably complementary local network topologies in which the censored peer device 102(1) and volunteer peer device 102(3) are operating, which may restrict the combinations that are more optimal for maintaining reasonable connectivity, along with any other contextual information. In this particular example, the rendezvous peer device 102(2) identifies the volunteer peer device 102(1) as a match for the censored peer device 102(2) and subsequently retrieves the network location for the volunteer peer device 102(3) (e.g., from local storage) and generates and sends the SDP answer to the censored peer device 102(1).

Thus, before the rendezvous peer device 102(1) performing its matching algorithm, the volunteer peer device 102(3) performs a similar method as described above with respect to step 200. Specifically, the volunteer peer device 102(3) determines its network location and provides an SDP offer with that network location and negotiation metadata to the rendezvous peer device 102(2). Once the rendezvous peer device 102(2) matches the volunteer peer device 102(3) to the censored peer device 102(1), the rendezvous peer device 102(2) provides an SDP answer to the volunteer peer device 102(3) that includes the network location of the filtered peer and other information (e.g., a session ID).

In step 204, the volunteer peer device 102(3) and the censored peer device 102(1) establish a peer connection based on the opposing network location information provided in respective SDP answers, for example, from the rendezvous peer device 102(2). In some examples, the network location includes an IP address and a port number associated with a port that is held open by the respective volunteer peer device 102(3) and the censored peer device 102(1) after the SDP offer with that information is communicated to the rendezvous peer device 102(2). Thus, a listener associated with the circumvention application 114, or a socket secure (SOCKS) proxy server established by that application on the volunteer peer device 102(3) and/or the censored peer device 102(1), facilitates the connection establishment.

Subsequently, outbound network traffic from the censored peer device 102(1) is transformed (e.g., via the web real-time communication (WebRTC) protocol or another protocol) to facilitate successful evasion of the censor. More specifically, the network traffic generated by operation of a web browser at the censored peer device 102(1) in the form of HTTP message can be streamed via the WebRTC protocol using the SOCKS proxy server(s) and established connection between the censored peer device 102(1) and the volunteer peer device 102(3).

At the volunteer peer device 102(3), the HTTP messages are extracted from the network traffic, executed against network hosts that are filtered with respect to the censored peer device 102(1), and the responsive network data is returned by the volunteer peer device 102(3), via the SOCKS proxy server(s) the WebRTC protocol, and the established connection, to the censored peer device 102(1). While the WebRTC protocol is used in some of the examples described herein, other protocols can also be used in other examples to effectively encapsulate the HTTP network traffic.

In step 206, the volunteer peer device 102(3) optionally assists other censored peer devices in the same or other censored regions to access network hosts in the global Internet that are otherwise restricted to those censored peer devices. In step 208, the volunteer peer device 102(3) provides unfettered and secure access to the global Internet to the censored peer device 102(3) by extracting HTTP network traffic from the WebRTC messages received from the censored peer device 102(1) and processing that HTTP network traffic to request network content from network hosts restricted with respect to the censored peer device 102(1). The obtained network content is then returned via the WebRTC connection or tunnel via other HTTP network traffic to the censored peer device 102(1) and optionally rendered and/or processed by a web browser executing on that device.

Figure 3:
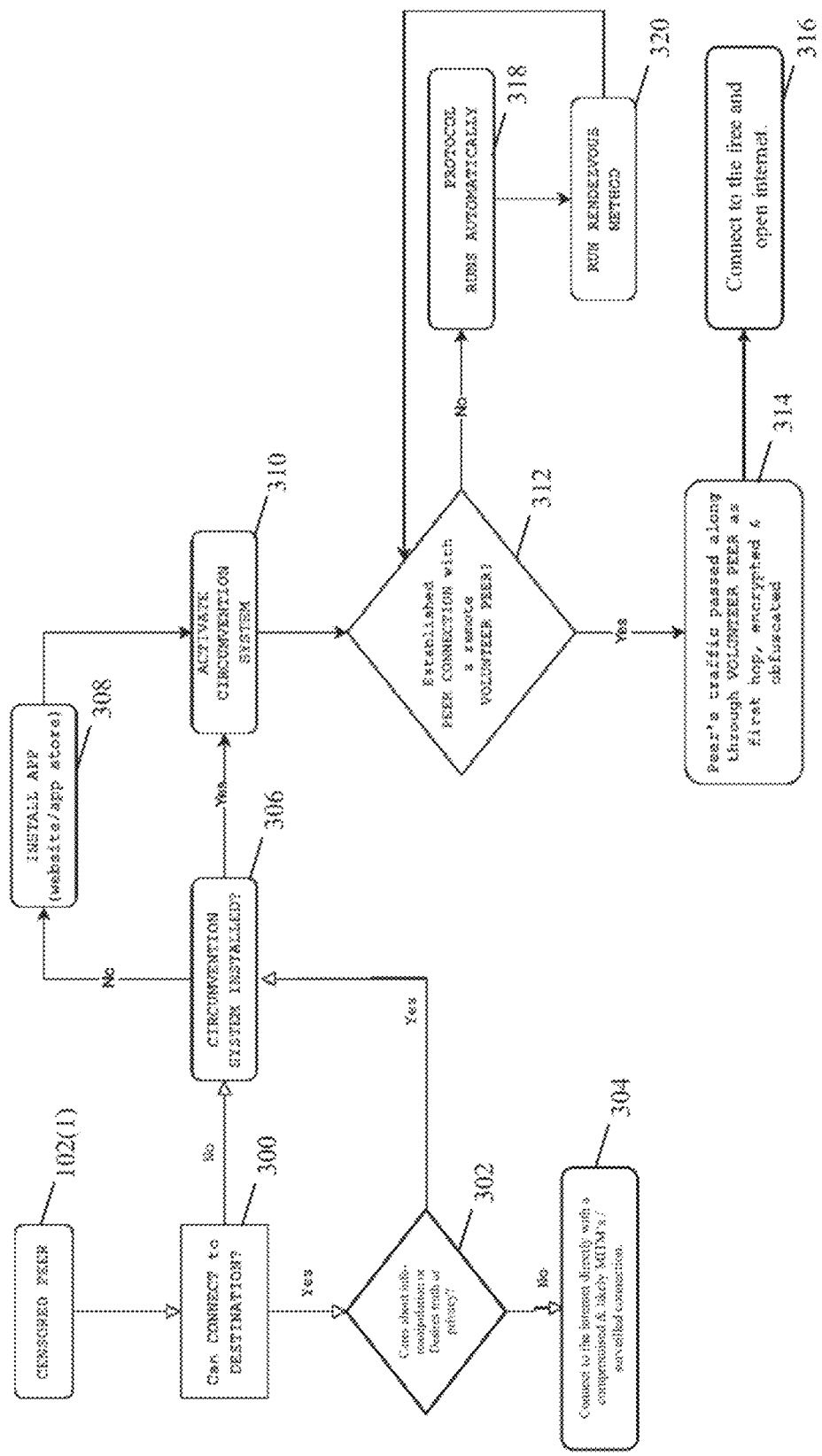
FIG. 3 is a flowchart of an exemplary method for facilitating network censorship circumvention by a censored peer device in a censored region.

Referring now to FIG. 3, a flowchart of an exemplary method for facilitating network censorship circumvention by the censored peer device 102(1) in a censored region is illustrated. In step 300 in this example, the censored peer device 102(1) determines whether it can connect to a destination, which can be a network host on a computer network such as the Internet, for example. The determination in step 300 can be based on an error returned to a web browser or any other indication that a particular network host is unavailable (e.g., as a result of filtering or censorship). If the censored peer device 102(1) determines that it can connect to a particular destination, then the Yes branch is taken to step 302.

In step 302, the censored peer device 102(1) determines whether access to the destination is important sufficient to implicate the technology described and illustrated herein. The determination in step 302 can be based on a prompt generated by the circumvention application 114 at the censored peer device 102(1), a default setting of the censored peer device 102(1), or any other indication provided to the censored peer device 102(1). Thus, if the censored peer device 102(1) determines that the risk of info-manipulation, reduced truth, and/or reduced privacy in Internet access does not exceed a threshold, then the No branch is taken to step 304.

In step 304, the censored peer device 102(1) connects to the Internet directly with a connection that may be compromised, subjected to MITM attacks, and/or surveilled, among other nefarious activity that may be associated with the connection. However, if the censored peer device 102(1) determines in step 300 that it cannot connect to a destination and the No branch is taken, or in step 302 that the user does in fact care about having an uncensored connection and the Yes branch is taken, then the censored peer device 102(1) proceeds to step 306.

In step 306, the censored peer device 102(1) determines whether a circumvention system is installed, such as the circumvention application 114, the operation of which is described and illustrated herein with reference to steps 312-320, for example. The determination in step 306 can be made by a web browser configured to determine whether a particular application (e.g., the circumvention application 114) is installed, for example, although other types of circumvention systems can be installed and other methods for resolving the determination in step 306 can also be used. If the censored peer device 102(1) determines that a circumvention system is not currently installed, then the No branch is taken to step 308.

In step 308, the censored peer device 102(1) installs the circumvention system, which in the examples described and illustrated herein is the circumvention application 114 (or at least a censored module 116 thereof). Subsequent to installing the circumvention application 114, or if the censored peer device 102(1) determines in step 306 that a circumvention system is already installed and the Yes branch is taken, then the censored peer device 102(1) proceeds to step 310.

In step 310, the censored peer device 102(1) activates the circumvention system. In some examples, the circumvention system is activated in response to a user input to a graphical interface provided by the circumvention application 114, although other methods for activating the circumvention system can also be used. While a native (e.g., mobile or desktop) circumvention application 114 is the circumvention system in the examples described and illustrated herein, other types of circumvention systems that operate within a web browser environment, either as a website which can be left open as a browser tab to contribute to the network or as a browser extension that can run in the background, and/or a standalone binary or command line tool that can be run continuously can also be used in other examples.

In step 312, the censored peer device 102(1) determines whether a successful peer connection with a remote volunteer peer device 102(3) can be established. The determination in step 312 can be made as will now be described with reference to FIG. 4, which is a flowchart of an exemplary method for establishing a peer connection with the volunteer peer device 102(3) in an uncensored region by the censored peer device 102(1) in a censored region. In step 400 in this example, the censored peer device 102(1) obtains censored peer location information, which can be an IP address and a port, for example, although other types of location information can also be used in other examples.

In many implementations of this technology, the censored peer device 102(1) will be behind a network address translation (NAT) device. As a result of IPv4 address space limitations, among other reasons in particular examples, connectivity via a NAT device (e.g., router) is a typical deployment of user or client devices executing web browsers to facilitate access to the global Internet via an Internet service provider (ISP). To provide censored peer location information useful for facilitating a peer connection, the censored peer device 102(1) in some examples can perform an interactive connectivity establishment (ICE) negotiation in the context of the WebRTC protocol, although other methods for determining the IP address and port information for the censored peer device 102(1) can also be used.

In an ICE negotiation, the censored peer device 102(1) makes a binding request to a server device (e.g., on the Internet), such as a session traversal of user datagram protocol (UDP) through NATs) (STUN) server. In response, the server device returns the censored peer location information in the form of an IP address and port of the censored peer device 102(1). Other types of server devices, including traversal using relays around NAT (TURN) servers can also be used to obtain the censored peer location information in other examples.

In step 402, a local router of the censored peer device 102(1) holds open an endpoint in accordance with the censored peer location information (i.e., the public IP address and port obtained in step 400). In step 404, the censored peer device 102(1) sends the censored peer location information to the rendezvous peer device 102(2) optionally encapsulated as an SDP offer, such as in the body of an HTTP message, for example, although the censored peer location information can be communicated to the rendezvous peer device 102(2) in other ways. In some examples, the rendezvous peer device 102(2) is discoverable by the circumvention application 114 executing on the censored peer device 102(1), although the rendezvous peer device 102(2) can be located by the censored peer device 102(1) in other ways.

As will be explained in more detail below, any number of volunteer peer devices can be performing steps 400-404 contemporaneously with, or prior to, the censored peer device 102(1). The SDP offer enables connectivity to the remote volunteer peer device 102(3) in this example. Thus, the rendezvous peer device 102(2) is effectively a signaling channel for facilitating establishment of initial connection between volunteer and censored peer devices, although other methods for performing an initial handshake and facilitating that connection can also be used. For example, a copy-paste signaling mechanism can be used as a signaling channel based on manual copy and paste of SDP messages between users of the volunteer and censored peer devices (e.g., via short message service (SMS) messages or chat services).

In step 406, the censored peer device 102(1) determines whether the rendezvous peer device 102(2) has determined that there is a match of the censored peer device 102(1) with the volunteer peer device 102(3). The matching by the rendezvous peer device 102(2) will be described and illustrated in more detail below with reference to FIG. 7. However, the determination in step 406 can be made based on whether an SDP answer is received from the rendezvous peer device 102(2) in response to the SDP offer sent in step 404. If the censored peer device 102(1) determines that there was not a match, then the No branch is taken to step 318 of FIG. 3, as will be described in more detail below. However, if the censored peer device 102(1) determines in step 406 that there is a match, then the Yes branch is taken to step 408.

In step 408, the censored peer device 102(1) obtains location information for the volunteer peer device 102(3) from the rendezvous peer device 102(2). For example, the censored peer device 102(1) can extract an IP address and port for the volunteer peer device 102(3) matched by the rendezvous peer device 102(2) from an SDP answer received from that device.

In step 410, the censored peer device 102(1) establishes a peer connection with the volunteer peer device 102(3) using the volunteer peer location information obtained in step 408. The established peer connection is associated with a peer network protocol (e.g., WebRTC) in this particular example. Subsequent to establishing the connection, the censored peer device 102(1) proceeds to step 314, which will also be explained in more detail below.

Figure 4:
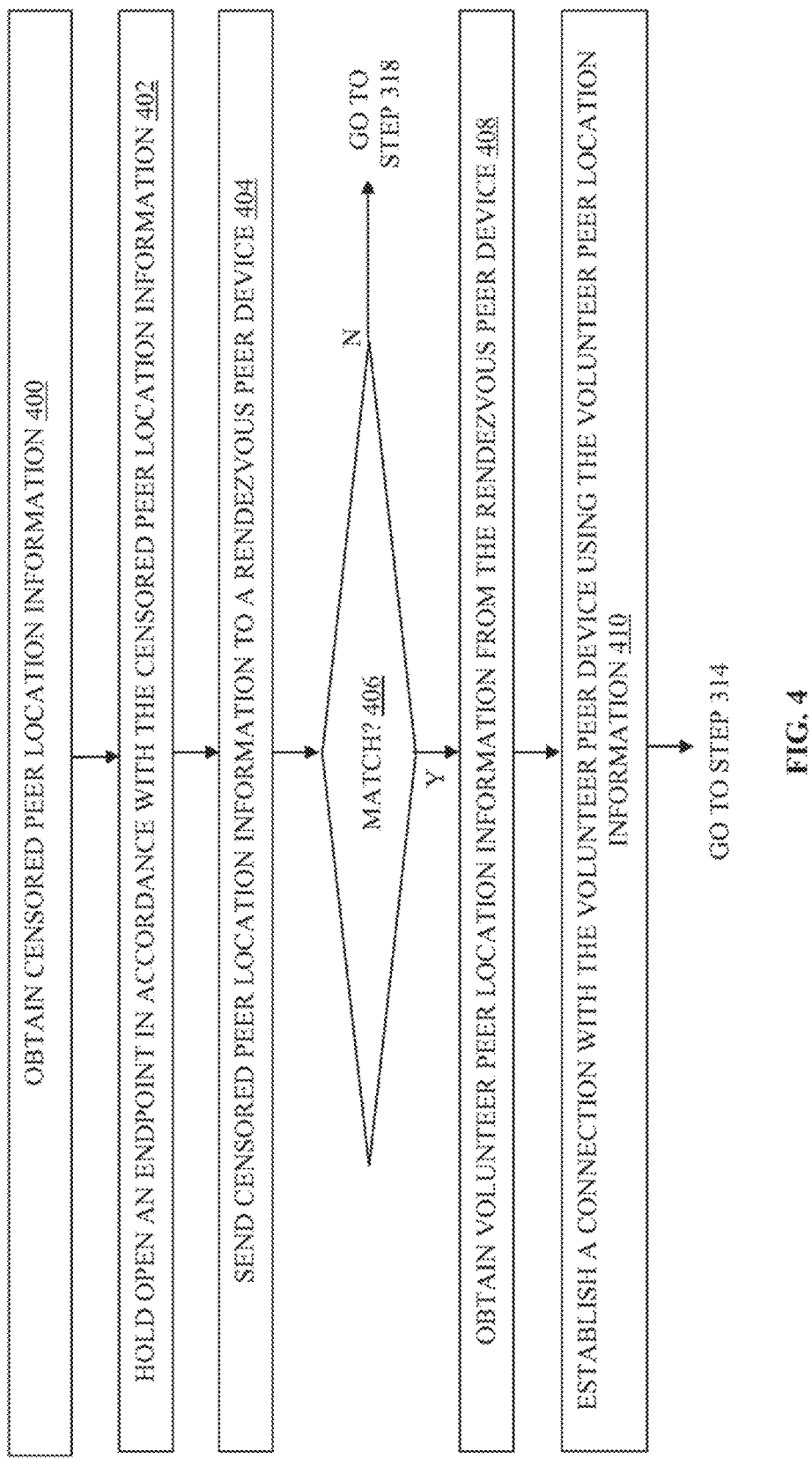
FIG. 4 is a flowchart of an exemplary method for establishing a peer connection with a volunteer peer device in an uncensored region by a censored peer device in a censored region.

Thus, referring back to FIG. 3, if the censored peer device 102(1) determines that a peer connection was successfully established with the remote volunteer peer device 102(3) in step 410 of FIG. 4, then the Yes branch is taken to step 314. In step 314, the censored peer device 102(1) uses the established peer connection as a tunnel to send or stream HTTP network traffic and thereby access the Internet via the volunteer peer device 102(3). Specifically, in some examples, the censored peer device 102(1) can create a local proxy interface (e.g., a socket secure (SOCKS) proxy server) to which a web browser executing on the censored peer device 102(1) (and/or the device itself) can be pointed to cause network traffic to flow through the localhost SOCKS proxy server instead of a default route.

The circumvention application 114 can be an intermediary between the SOCKS proxy server and the web browser, for example, which encapsulates the network traffic in a format that the circumvention application at the volunteer peer device 102(3) on the other side of the connection can understand and interpret. In other examples, the circumvention application 114 can be integral with the web browser and other types of deployments and installation can also be used in other examples. Thus, the network traffic can be modified to look like ordinary WebRTC traffic, and to simulate normal video call traffic, in some examples, such that the traffic generated by the browser is streamed in an HTTP format, for example, via the WebRTC connection or tunnel. Optionally, the network traffic can be encrypted or otherwise obfuscated for increased security.

In step 316, the censored peer device 102(1) connects to the free and open Internet using the established peer connection. On the other side of the peer connection, the network traffic transmitted in step 314 is unwrapped by the volunteer peer device 102(3) at another SOCKS proxy server and via another circumvention application 114, which can then send the network traffic out to the broader Internet as if it were normal Internet request(s).

While WebRTC is used in some examples here, any other protocol and transport (e.g., multi-address encodings or addressing schemes, Wi-Fi Direct™, IEEE 802.11, Apple™ wireless direct link (AWDL), transports at various OSI layers, and various Internet of things (IoT) protocols (e.g., Thread)) can also be used in other examples. Optionally, the circumvention application 114 can be configured to select the most appropriate network protocol(s) by attempting to establish a connection and/or using scoring. Additionally, the tunnel can be encapsulated lower in the network stack (e.g., layer 2/3 of the open systems interconnection (OSI) model) as compared to the SOCKS proxy server. Specifically, the censored peer device 102(1) can instead be configured to create a virtual network interface (VNI), which can improve performance and extensibility.

Referring back to step 312, if the censored peer device 102(1) determines that a peer connection was unable to be established with any volunteer peer device (e.g., no match was determined to be identified in step 406 of FIG. 4), then the No branch is taken step 318. In step 318, the censored peer device 102(1) executes a protocol automatically via the circumvention application 114, for example, to continue polling the rendezvous peer device 102(2) with SDP offers at selected times or predefined intervals, for example.

In step 320, the censored peer device 102(1) optionally executes a rendezvous method via the circumvention application 114. The rendezvous method is described and illustrated in more detail below with reference to FIG. 7. Thus, although the censored peer device 102(1) is in a censored region and unable to establish a connection with a remote volunteer peer device in this example, the censored peer device 102(1) can advantageously act as a rendezvous peer device to facilitate connections via a signaling channel for other censored and volunteer peer devices. Subsequent to step 320, the censored peer device 102(1) proceeds back to step 312 in this example, and steps 312-320 are repeated.

Figure 5:
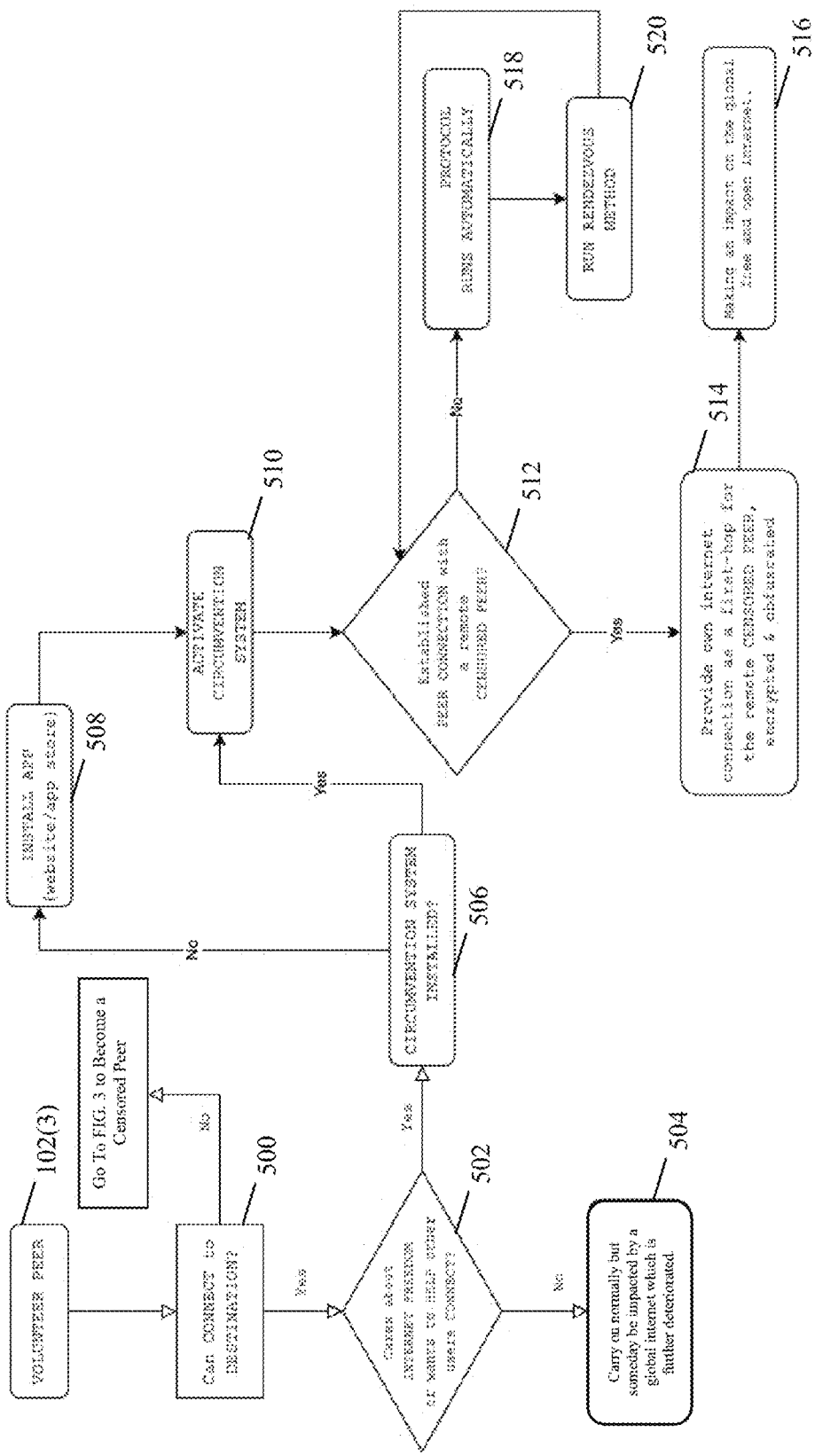
FIG. 5 is a flowchart of an exemplary method for facilitating network censorship circumvention by a volunteer peer device in an uncensored region.

Referring now to FIG. 5, a flowchart of an exemplary method for facilitating network censorship circumvention by the volunteer peer device 102(3) in an uncensored region is illustrated. In step 500 in this example, the volunteer peer device 102(3) determines whether it can connect to a destination, such as a particular network host on the Internet, for example. The determination in step 500 can be made as explained above with reference to step 300 of FIG. 3, for example. If the volunteer peer device 102(3) determines that it cannot connect to a destination, then it may be in a censored region and the No branch is taken to FIG. 3 (e.g., step 306) to facilitate operation of the volunteer peer device 102(3) as a censored peer device. However, if the volunteer peer device 102(3) determines that it can connect to a destination, and is therefore in an uncensored region, then the Yes branch is taken to step 502.

In step 502, the volunteer peer device 102(3) determines whether a user of that device cares about Internet freedom such that the user wants to help other peer device users connect to the Internet in a free and unfettered manner. The determination in step 502 can be made based on a user interface output to a display device of the volunteer peer device 102(3) by the circumvention application 114 executing on that device, for example. If the volunteer peer device 102(3) determines that the user does not care about becoming a volunteer peer device, then the No branch is taken to step 504.

In step 504, the volunteer peer device 102(3) continues to facilitate access (e.g., via a web browser) to the global Internet without facilitating such access to others that may be located in a censored region. However, if the volunteer peer device 102(3) determines in step 502 that the user does care about becoming a volunteer peer device, then the Yes branch is taken to step 506.

In steps 506-510, the volunteer peer device 102(3) determines whether a circumvention system is currently installed, facilitates installation of the circumvention application 114 (or at least a volunteer module 120 thereof) if a determination is made that a circumvention system is not installed, and activates the circumvention system, respectively, as described and illustrated in more detail above with reference to steps 306-310, respectively, of FIG. 3.

In step 512, the volunteer peer device 102(3) determines whether a successful a peer connection with a remote censored peer device 102(1) can be established. The determination in step 512 can be made as will now be described with reference to FIG. 6, which is a flowchart of an exemplary method for establishing a peer connection with the censored peer device 102(1) in a censored region by the volunteer peer device 102(3) in an uncensored region.

In step 600, the volunteer peer device 102(3) obtains volunteer peer location information (e.g., an IP address and port). The volunteer peer device 102(3) can obtain its network location information via a STUN server in examples in which the volunteer peer device 102(3) is behind a NAT device, as explained in more detail above with respect to the censored peer device 102(1) and with reference to step 400 of FIG. 4, although other methods for obtaining the volunteer peer location information can also be used.

In step 602, the volunteer peer device 102(3) holds open an endpoint in accordance with the volunteer peer location information, which can be used to facilitate one side of a WebRTC or other tunnel, as also explained above with respect to the censored peer device 102(1) and with reference to step 402 of FIG. 4. In step 604, the volunteer peer device 102(3) sends the volunteer peer location information to the rendezvous peer device 102(2) optionally encapsulated as an SDP offer, such as in the body of an HTTP message, for example, although the volunteer peer location information can be communicated to the rendezvous peer device 102(2) in other ways. In some examples, the rendezvous peer device 102(2) is discoverable by the circumvention application 114 executing on the volunteer peer device 102(3), although the rendezvous peer device 102(2) can be located by the volunteer peer device 102(3) in other ways.

In step 606, the volunteer peer device 102(3) determines whether the rendezvous peer device 102(2) has determined that there is a match of the volunteer peer device 102(3) with the censored peer device 102(1). The matching by the rendezvous peer device 102(2) will be described and illustrated in more detail below with reference to FIG. 7. However, the determination in step 606 can be made based on whether an SDP answer is received from the rendezvous peer device 102(2) in response to the SDP offer sent in step 604. If the volunteer peer device 102(3) determines that there was not a match, then the No branch is taken to step 518 of FIG. 5, as will be described in more detail below. However, if the volunteer peer device 102(3) determines in step 606 that there is a match, then the Yes branch is taken to step 608.

In step 608, the volunteer peer device 102(3) obtains location information for the censored peer device 102(3) from the rendezvous peer device 102(2). For example, the volunteer peer device 102(3) can extract an IP address and port for the censored peer device 102(1) matched by the rendezvous peer device 102(2) from an SDP answer received from that device.

In step 610, the volunteer peer device 102(3) establishes a peer connection with the censored peer device 102(1) using the censored peer location information obtained in step 608. The established peer connection is associated with a peer network protocol (e.g., WebRTC) in this example. After establishing the connection, the volunteer peer device 102(3) proceeds to step 614, which will also be explained in more detail below. Thus, the volunteer peer device 102(3) in this example is configured to perform the equivalent steps as explained above with respect to the censored peer device 102(1) and with reference to FIG. 4 to facilitate and establish its side of the peer connection.

Figure 6:
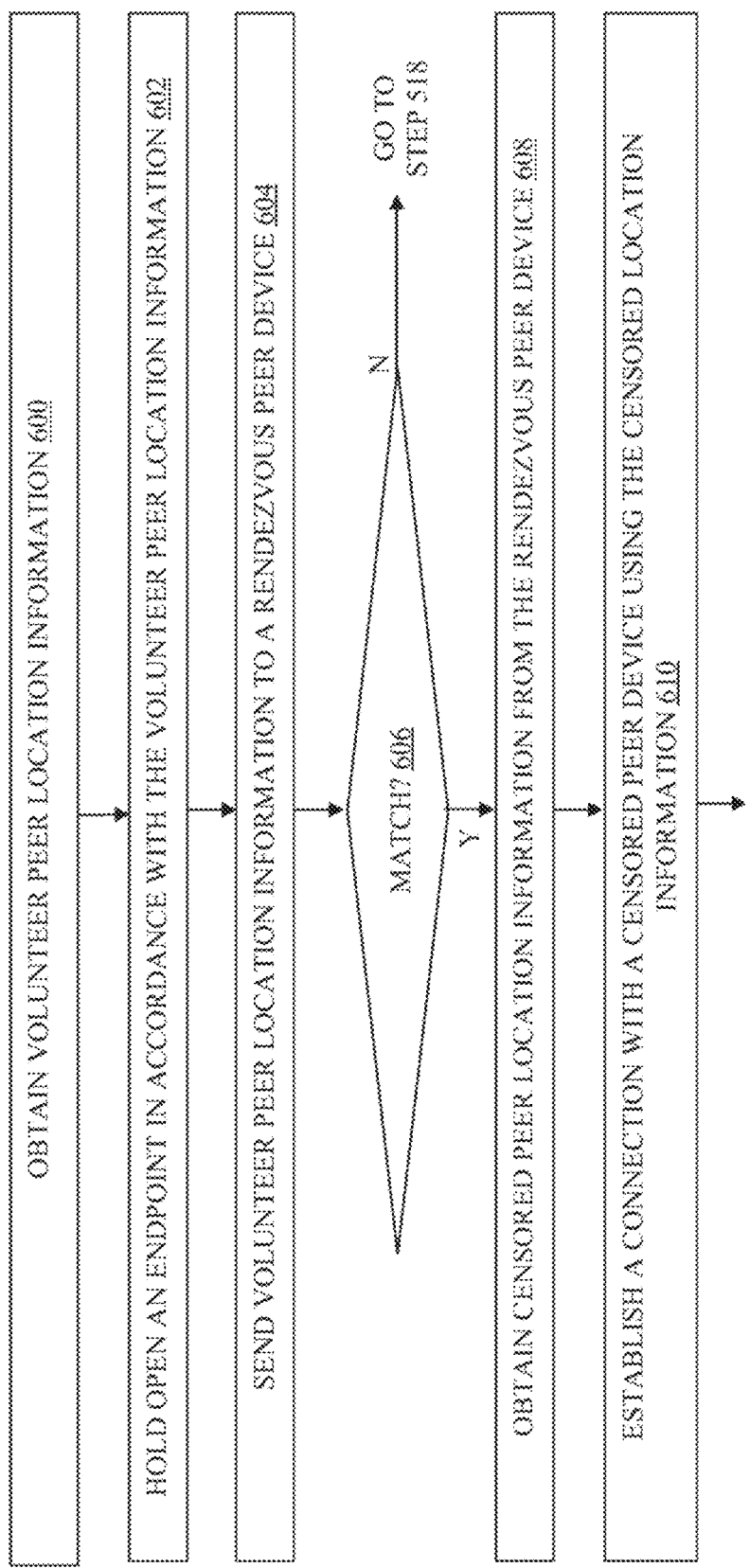
FIG. 6 is a flowchart of an exemplary method for establishing a peer connection with a censored peer device in a censored region by a volunteer peer device in an uncensored region.

Referring back to FIG. 5, if the volunteer peer device 102(3) determines that a peer connection was successfully established with the remote censored peer device 102(1) in step 610 of FIG. 6, then the Yes branch is taken to step 514. In step 514, the volunteer peer device 102(3) receives network traffic from the censored peer device 102(1) via the established peer connection. The network traffic can conform to an HTTP format and can be streamed or encapsulated within another network protocol corresponding to the peer connection (e.g., WebRTC) to thereby provide access to the Internet (e.g., restricted network hosts) to the censored peer device 102(1).

The circumvention application 114 can be configured to link to the endpoint associated with the peer connection to extract the network traffic and can subsequently process the network traffic to make requests at network hosts on the Internet that would otherwise be restricted to the censored peer device 102(1). As explained above, the network traffic can be modified to look like ordinary WebRTC traffic, and to simulate normal video call traffic, in some examples, such that the traffic generated by the web browser of the censored peer device 102(1) is streamed in an HTTP format, for example, via the WebRTC connection or tunnel. Optionally, the network traffic can be encrypted or otherwise obfuscated for increased security.

In step 516, the volunteer peer device 102(3) connects to the free and open Internet to satisfy requests in accordance with the extracted network traffic. Thus, the volunteer peer device 102(3) can obtain network content at restricted network hosts, encapsulate or stream the associated HTTP network traffic in accordance with WebRTC or another peer-to-peer network protocol, and send the WebRTC messages across the peer connection to the censored peer device 102(1) to be unwrapped (e.g., at a SOCKS proxy server) and processed (e.g., for display by a web browser). Optionally, a user of the volunteer peer device 102(3) can interface with the circumvention application 114 executing on that device to limit the amount of bandwidth dedicated to censored peer device(s) while volunteering.

Also optionally, the circumvention application 114 executing on the censored peer device 102(1) can continuously ping the rendezvous peer device 102(2) and take other actions to construct and store information regarding multiple route options through any number of volunteer peer devices to facilitate dynamic transport switching. The various routes can be scored such that a degradation in latency or network instability can trigger a switch in transport, which can include the protocol used and/or the path or route through volunteer peer devices to the global Internet.

To facilitate the scoring, censored and volunteer peer devices can exchange connection state messages that include negotiation metadata used to generate device-specific scores, and/or the scores themselves if determined at those peer devices. For example, if the load on a volunteer peer device increases, it can report a reduced score to other censored and/or volunteer peer devices via connection state messages exchanged or propagated across established peer connections among those devices. Thus, dynamic scoring can be facilitated in a mesh network through volunteer peer devices not actively consuming connections and associated network traffic from censored peer devices, for example.

Using such gradations of scoring, local peer devices do not necessarily need to store the full context of a global mesh network. Instead, local peer devices (e.g., geographically adjacent or adjacent within the network) only need context on the localized parts of the mesh network and neighboring contexts that could actually be used for a peer connection. In other examples or implementations, other characteristics can be prioritized higher based on the particular scoring methodology, sch that certain types of transports are prioritized that provide a higher degree of anonymization, for example.

Referring back to step 512, if the volunteer peer device 102(3) determines that a peer connection was unable to be established with any censored peer device (e.g., no match was determined to be identified in step 606 of FIG. 6), then the No branch is taken step 518. In step 518, the volunteer peer device 102(3) executes a protocol automatically via the circumvention application 114, for example, to continue polling the rendezvous peer device 102(2) with SDP offers at selected times or predefined intervals, for example, to confirm to the rendezvous peer device 102(2) that it is still available to help facilitate a connection to the global Internet on behalf of censored peer device(s).

In step 520, the volunteer peer device 102(3) optionally executes a rendezvous method via the circumvention application 114. The rendezvous method is described and illustrated in more detail below with reference to FIG. 7. Thus, although the volunteer peer device 102(3) was unable to establish a connection with a remote censored peer device in this example, the volunteer peer device 102(3) can advantageously act as a rendezvous peer device to facilitate connections via a signaling channel for other censored and volunteer peer devices. Subsequent to step 520, the volunteer peer device 102(3) proceeds back to step 512 in this example, and steps 512-520 are repeated.

Figure 7:
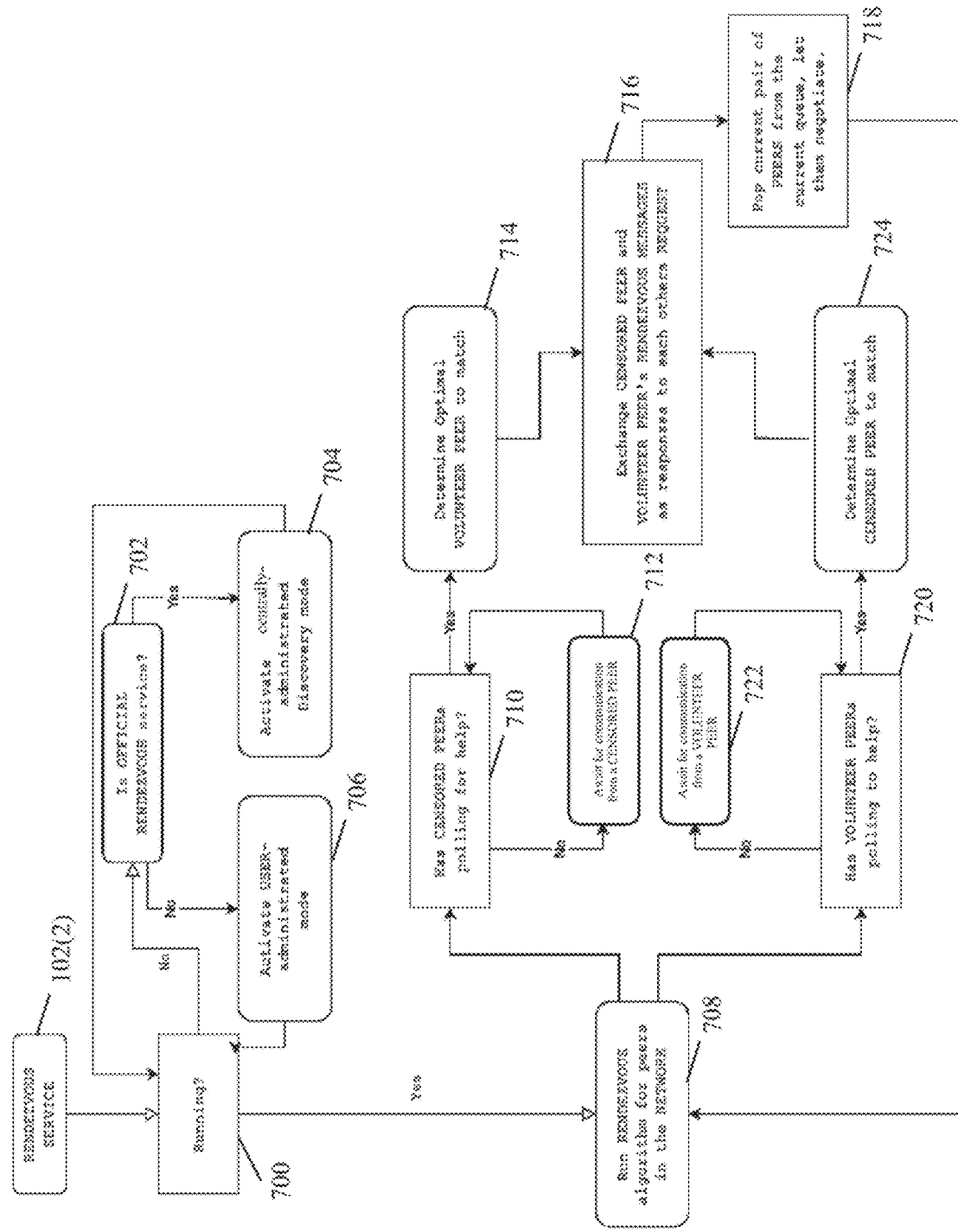
FIG. 7 is a flowchart of an exemplary method for coordinating a peer connection between a volunteer peer device in an uncensored region and a censored peer device in a censored region by a rendezvous peer device.

Referring now to FIG. 7, a flowchart of an exemplary method for coordinating a peer connection between the volunteer peer device 102(3) in an uncensored region and the censored peer device 102(1) in a censored region by the rendezvous peer device 102(2) is illustrated. In step 700 in this example, the rendezvous peer device 102(2) determines whether a rendezvous method or service is executing on the rendezvous peer device 102(2). If the rendezvous peer device 102(2) determines that a rendezvous service is not currently executing, then the No branch is taken to step 702.

In step 702, the rendezvous peer device 102(2) determines whether the executing rendezvous service is an official service. In this example, both a centralized rendezvous service (also referred to herein as centrally administrated or official) and a decentralized rendezvous service (also referred to herein as user-administrated) are contemplated. Thus, the rendezvous service can be hosted by a central or authoritative entity or distributed and hosted by any of the peer devices 102(1)-102(n) that may be currently executing the circumvention application or at least the rendezvous module 118 thereof. If the rendezvous peer device 102(2) determines the executing rendezvous service is an official service, then the Yes branch is taken to step 704.

In step 704, the rendezvous peer device 102(2) activates a centrally administrated discovery mode that allows censored and volunteer peer devices to discover the rendezvous peer device 102(2). Various discovery mechanisms can be implemented by the circumvention applications 114(1)-114(n) for facilitate discovery of a rendezvous peer device by a volunteer or censored peer device. For example, the peers can collectively comprise an overlay network with a distributed hash table (DHT). If the rendezvous peer device 102(2) determines in step 702 the executing rendezvous service is not an official service, then the No branch is taken to step 706.

In step 706, the user-administrated mode is activated, which can operate in the same manner as the centrally administrated discovery mode or in a different manner. In some examples, these modes can use different matching algorithms to match volunteer and censored peer devices, different discoverability parameters, and/or restrictions or filtering mechanisms applied to potential censored and volunteer peer devices or associated users that can connect to take advantage of the activated rendezvous service. Other types of rendezvous services can also be used in other examples. Subsequent to activating the centrally administrated discovery mode in step 704 or the user-administrated mode in step 706, the rendezvous peer device 102(2) proceeds back to step 700 in this example. In this subsequent iteration of step 700, the condition regarding whether the rendezvous service is executing will be satisfied, and the Yes branch will therefore be taken to step 708.

In step 708, the rendezvous peer device 102(2) executing the rendezvous algorithm for peer devices, which will now be explained with reference to steps 710-718 and steps 718-724, which can be performed in parallel for any number of censored and volunteer peer devices, respectively. More specifically, in step 710, the rendezvous peer device 102(2) determines whether a censored peer device is currently polling for help. The polling can include receipt of an SDP offer from a censored peer device encapsulated by or in the body of an HTTP request received via an HTTP connection with that device, as explained in more detail above. Optionally, the handshake communication from a censored peer device can be domain-fronted or another technique or capability (e.g., server name indicator (SNI) spoofing, domain name system (DNS) tunneling, and accelerated mobile pages (AMPs)) can be employed to ensure censorship resistance. If the rendezvous peer device 102(2) determines that a censored peer device is not currently polling for help, then the No branch is taken to step 712.

In step 712, the rendezvous peer device 102(2) waits for a communication from a censored peer device by continuing to listen for a polling or handshape message on an HTTP connection with a censored peer device in step 710. However, if the rendezvous peer device 102(2) determines that a censored peer device (e.g., the censored peer device 102(1)) has polled for help, then the Yes branch is taken to step 714.

In step 714, the rendezvous peer device 102(2) determines an optimal volunteer peer device (e.g., the volunteer peer device 102(3)) to match with the censored peer device 102(1). In some examples, the rendezvous peer device 102(2) executes a matching algorithm to identify matched volunteer and censored peer devices. The matching algorithm can consider negotiation metadata received from those devices as part of the polling communication for help or to help. For example, the negotiation metadata can include NAT information, a bridge fingerprint, a session ID, signal strength, geolocation, and/or network topology information, although other negotiation metadata can also be used in other examples.

In one example, the matching algorithm can be based on NAT type matching. In this example, the volunteer and censored peer devices detect their own local NAT topology and provide associated negotiation metadata to the rendezvous peer device 102(2). The rendezvous peer device 102(2) then matches volunteer and censored peer devices with NAT or other network topologies that are more likely to be compatible with successful establishment of a peer connection.

In other examples, the volunteer and/or censored peer devices, and/or potential matches of volunteer and censored peer devices, can be scored. For example, a volunteer peer device that is geographically closer to a censored peer device may be scored higher with respect to a match for that censored peer device than another volunteer peer device that is geographically farther from the censored peer device. When volunteer and censored peer devices are geographically closer, more radio protocols are available for use, latency may be lower, and bandwidth may be higher.

As another example, a volunteer peer device that is currently downloading a movie, or otherwise consuming significant resources (e.g., bandwidth) on that device, may be scored lower than another volunteer peer device that has significant available bandwidth, for example. Similarly, location specificity can impact scoring within the matching algorithm implemented by the rendezvous peer device 102 (2). For example, a volunteer peer device 102(3) associated with a particular park or building may have a different bandwidth than another device in a more generalized location.

In some examples in which a volunteer peer device is not identified that matches a censored peer device, then the rendezvous peer device 102(2) can drop the communication polling for help, respond with an indication that no volunteer peer device is available, and/or maintain the location information in the SDP offer along with negotiation metadata associated with the censored peer device to facilitate a subsequent match in another iteration, for example, although other actions can also be taken in other examples.

In this iteration in which the volunteer peer device 102(3) is identified as an optimal match for the censored peer device 102(1), the rendezvous peer device 102(2) in step 716 exchanges censored peer and volunteer peer messages (e.g., SDP offer messages with respective network location information) as responses to each HTTP request from the volunteer peer device 102(3) and the censored peer device 102(1). Each HTTP response can include in the body an SDP answer that includes the location information extracted from the SDP offer received from one of those devices. The volunteer peer location information can then be received by the censored peer device 102(1) as explained above with reference to step 408 of FIG. 4, the censored peer location information can be received by the volunteer peer device 102(3) as explained above with reference to step 608 of FIG. 6, and the peer connection can be established as also explained above with reference to steps 410 and 610 of FIGS. 4 and 6, respectively, for example.

In step 718, the rendezvous peer device 102(2) pops information identifying the volunteer peer device 102(3) and the censored peer device 102(1) off a queue to reflect the match identified in step 714 and peer connection facilitated in step 716. The rendezvous peer device 102(2) can then return to step 708 to continue facilitating other peer connections while the volunteer peer device 102(3) and the censored peer device 102(1) negotiate to establish and subsequently maintain their peer connection. To determine the optimal match in step 714, the volunteer peer device 102(3) will have previously provided its location information to the rendezvous peer device 102(2) as will now be described with reference to steps 720-724.

In step 720, the rendezvous peer device 102(2) determines whether a volunteer peer device has polled to indicate a willingness to help connect censored peer device(s) obtain unfettered access to the global Internet. The polling can include receipt of an SDP offer from a volunteer peer device encapsulated by or in the body of an HTTP request received via an HTTP connection with that device, as explained in more detail above. While a polling pattern is contemplated herein in steps 710 and 720, in other examples, other event/signaling mechanisms (e.g., publish-subscribe messaging) can also be used. Additionally, while HTTP messaging is contemplated for the requests and responses that include the SDP offers and answers, in other examples, any other network protocol can also be used. If the rendezvous peer device 102(2) determines that a volunteer peer device is not currently polling for help, then the No branch is taken to step 722.

In step 722, the rendezvous peer device 102(2) waits for a communication from a volunteer peer device by continuing to listen for a polling or handshape message on an HTTP connection with a volunteer peer device in step 720. However, if the rendezvous peer device 102(2) determines that a volunteer peer device (e.g., the volunteer peer device 102 (3)) has polled for help, then the Yes branch is taken to step 724.

In step 724, the rendezvous peer device 102(2) determines an optimal censored peer device to match with the volunteer peer device 102(3) in the same manner as described and illustrated in more detail above with reference to step 714. The rendezvous peer device 102(2) then proceeds to step 716 to exchange messages with network location information between the censored peer device 102(1) and the volunteer peer device 102(3) to facilitate establishment of a peer connection between those devices. The rendezvous peer device 102(2) subsequently proceeds to step 718 as explained above and then back to step 708. In other examples, one or more of steps 710-724 can be performed in a different order and/or in parallel for any number of the peer devices 102(1)-102(n).

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the terms "worker," "algorithm," "system," "module," "engine," or "architecture," if used herein, are not intended to be limiting of any particular implementation for accomplishing and/or performing the actions, steps, processes, etc., attributable to and/or performed thereby. An algorithm, system, module, engine, and/or architecture may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, engine, and/or architecture may be equally performed by multiple algorithms, systems, modules, engines, and/or architectures incorporated into and/or combined with the functionality of another algorithm, system, module, engine, and/or architecture of the same or different type, or distributed across one or more algorithms, systems, modules, engines, and/or architectures of various configurations.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for network censorship circumvention, the method implemented by a censored peer device and comprising:
   sending to a rendezvous peer device censored peer location information;
   establishing a connection with a volunteer peer device using volunteer peer location information received from the rendezvous peer device and corresponding to the volunteer peer device, wherein the volunteer peer device is matched to the censored peer device by the rendezvous peer device;
   sending to the volunteer peer device first network traffic in accordance with a first network protocol using a second network protocol associated with the established connection, wherein the first network traffic is directed to a network host restricted with respect to the censored peer device and the second network protocol is a peer-to-peer network protocol; and
   extracting second network traffic responsive to the first network traffic from one or more first network messages to obtain access to the restricted network host via the volunteer peer device, wherein the one or more first network messages are in accordance with the second network protocol and received via the established connection.

2. The method of claim 1, wherein one or more of the censored peer location information or the volunteer peer location information comprises an Internet protocol (IP) address and a port number and the method further comprises obtaining the censored peer location information from a server device disposed on an opposite side of a network address translation (NAT) device as the censored peer device.

3. The method of claim 1, wherein the first network protocol is hypertext transfer protocol (HTTP), the second network protocol is web real-time communication (WebRTC), and the method further comprises:
   holding open a first endpoint in accordance with the censored peer location information after sending the censored peer location information to the rendezvous peer device;
   establishing the connection via a second endpoint at the volunteer peer device and corresponding to the volunteer peer location information; and
   rendering in a web browser of the censored peer device the second network traffic extracted from the first network messages in the WebRTC protocol.

4. The method of claim 3, wherein the first endpoint corresponds to a virtual network interface (VNI).

5. The method of claim 1, further comprising:
   sending a session description protocol (SDP) offer in a first body of a first hypertext transfer protocol (HTTP) message to the rendezvous peer device, the SDP offer comprising the censored peer location information; and
   receiving an SDP answer in a second body of a second HTTP message from the rendezvous peer device, the SDP answer comprising the volunteer peer location information.

6. The method of claim 1, further comprising:
   instantiating a local socket secure (SOCKS) proxy server interface;
   configuring a web browser executing on the censored peer device to direct the first network traffic generated by the web browser to the local SOCKS proxy server interface; and
   encapsulating the first network traffic in one or more second network messages in a format in accordance with the second network protocol, wherein the local SOCKS proxy server interface corresponds to an endpoint of the established connection at the censored peer device.

7. The method of claim 1, further comprising:
   determining that the network host is restricted before sending the censored peer location information to the rendezvous peer device; and
   polling the rendezvous peer device until the volunteer peer location information is received from the rendezvous peer device upon the rendezvous peer device matching the volunteer peer device to the censored peer device.

8. The method of claim 1, further comprising sending to the rendezvous peer device negotiation metadata before establishing the connection, wherein the negotiation metadata is used by the rendezvous peer device to match the censored peer device to the volunteer peer device and comprises one or more of a network address translation (NAT) information, a bridge fingerprint, a signal strength, a geolocation, network topology information, a score, an indication of a current load, or another indication of a current bandwidth.

9. The method of claim 1, further comprising encrypting the first network traffic before streaming the first network traffic within one or more second network messages via the established connection and in accordance with the second network protocol.

10. A non-transitory computer readable medium having stored thereon instructions comprising executable code that, when executed by one or more processors of a volunteer peer device, causes the volunteer peer device to:
   send to a rendezvous peer device volunteer peer location information;
   establish a connection with a censored peer device using censored peer location information received from the rendezvous peer device and corresponding to the censored peer device, wherein the censored peer device is matched to the volunteer peer device by the rendezvous peer device;
   receive from the censored peer device first network traffic in accordance with a first network protocol using a second network protocol associated with the established connection, wherein the first network traffic is directed to a network host restricted with respect to the censored peer device and the second network protocol is a peer-to-peer network protocol;
   retrieve content from the network host in accordance with the first network traffic; and
   return to the censored peer device the retrieved content via the established connection and one or more network messages in accordance with the second network protocol, wherein the retrieved content is included in the network messages in accordance with the first network protocol.

11. The non-transitory computer readable medium of claim 10, wherein one or more of the censored peer location information or the volunteer peer location information comprises an Internet protocol (IP) address and a port number.

12. The non-transitory computer readable medium of claim 10, wherein the first network protocol is hypertext transfer protocol (HTTP), the second network protocol is web real-time communication (WebRTC), and the executable code, when executed by the processors, further causes the volunteer peer device to:
   hold open a first endpoint in accordance with the volunteer peer location information after sending the volunteer peer location information to the rendezvous peer device; and
   establish the connection via a second endpoint at the censored peer device and corresponding to the censored peer location information.

13. The non-transitory computer readable medium of claim 10, wherein the executable code, when executed by the processors, further causes the volunteer peer device to:
   send a session description protocol (SDP) offer in a first body of a first hypertext transfer protocol (HTTP) message to the rendezvous peer device, the SDP offer comprising the volunteer peer location information; and
   receive an SDP answer in a second body of a second HTTP message from the rendezvous peer device, the SDP answer comprising the censored peer location information.

14. The non-transitory computer readable medium of claim 10, wherein the executable code, when executed by the processors, further causes the volunteer peer device to poll the rendezvous peer device until the censored peer location information is received from the rendezvous peer device upon the rendezvous peer device matching the volunteer peer device to the censored peer device.

15. The non-transitory computer readable medium of claim 10, wherein the executable code, when executed by the processors, further causes the volunteer peer device to send to the rendezvous peer device negotiation metadata before establishing the connection, wherein the negotiation metadata is used by the rendezvous peer device to match the censored peer device to the volunteer peer device and comprises one or more of a network address translation (NAT) information, a bridge fingerprint, a signal strength, a geolocation, network topology information, a score, an indication of a current load, or another indication of a current bandwidth.

16. The non-transitory computer readable medium of claim 10, wherein the executable code, when executed by the processors, further causes the volunteer peer device to:
   decrypt the first network traffic before retrieving the content from the network host; and
   encrypt the second network traffic before streaming the second network traffic within the second network messages via the established connection and in accordance with the second network protocol.

17. A volunteer peer device, comprising memory having instructions stored thereon and one or more processors coupled to the memory and configured to execute the stored instructions to:
   send to a rendezvous peer device volunteer peer location information;
   establish a connection with a censored peer device using censored peer location information received from the rendezvous peer device and corresponding to the censored peer device, wherein the censored peer device is matched to the volunteer peer device by the rendezvous peer device;
   receive from the censored peer device first network traffic in accordance with a first network protocol using a second network protocol associated with the established connection, wherein the first network traffic is directed to a network host restricted with respect to the censored peer device and the second network protocol is a peer-to-peer network protocol;
   retrieve content from the network host in accordance with the first network traffic; and
   return to the censored peer device the retrieved content via the established connection and one or more network messages in accordance with the second network protocol, wherein the retrieved content is included in the network messages in accordance with the first network protocol.

18. The volunteer peer device of claim 17, wherein the first network protocol is hypertext transfer protocol (HTTP) and the second network protocol is web real-time communication (WebRTC).

19. The volunteer peer device of claim 17, wherein the one or more processors are further configured to execute the stored instructions to send a session description protocol (SDP) offer in a first body of a first hypertext transfer protocol (HTTP) message to the rendezvous peer device, the SDP offer comprising the volunteer peer location information.

20. The volunteer peer device of claim 17, wherein the one or more processors are further configured to execute the stored instructions to send to the rendezvous peer device negotiation metadata before establishing the connection, wherein the negotiation metadata is used by the rendezvous peer device to match the censored peer device to the volunteer peer device.

\* \* \* \* \*

UNITED STATES PATENT AND TRADEMARK OFFICE
CERTIFICATE OF CORRECTION

PATENT NO. : 11,968,254 B1
APPLICATION NO. : 18/378092
DATED : April 23, 2024
INVENTOR(S) : Serene Han It is certified that error appears in the above-identified patent and that said Letters Patent is hereby corrected as shown below:

On the Title Page

Item [12]:
Delete "Han et al." and insert --Han--

Item [72] Inventors:
After Serene Han, New York, NY (US), delete "Mykhailo Marynenko, New York, NY (US)"

Signed and Sealed this
Second Day of July, 2024

Katherine Kelly Vidal
*Director of the United States Patent and Trademark Office*